(12) United States Patent
Gulati et al.

(10) Patent No.: US 12,248,812 B2
(45) Date of Patent: Mar. 11, 2025

(54) ADAPTIVE SERVICE METERING ON PORTS IN A LINK AGGREGATION GROUP

(71) Applicant: Ciena Corporation, Hanover, MD (US)

(72) Inventors: Ashish Gulati, Paschim Vihar (IN); Sumit Hans, Faridabad (IN); Gagan Garg, Gurgaon (IN); Jayant Bhardwaj, Bijwasan (IN)

(73) Assignee: Ciena Corporation, Hanover, MD (US)

( * ) Notice: Subject to any disclaimer, the term of this patent is extended or adjusted under 35 U.S.C. 154(b) by 506 days.

(21) Appl. No.: 17/559,848

(22) Filed: Dec. 22, 2021

(65) Prior Publication Data

US 2023/0147684 A1 May 11, 2023

(30) Foreign Application Priority Data

Nov. 9, 2021 (IN) .............................. 202111051297

(51) Int. Cl.
*G06F 9/46* (2006.01)
*G06F 9/50* (2006.01)

(52) U.S. Cl.
CPC .................. *G06F 9/5027* (2013.01)

(58) Field of Classification Search
CPC ................................................... G06F 9/5027
See application file for complete search history.

(56) References Cited

U.S. PATENT DOCUMENTS

| 10,015,066 B2 | 7/2018 | Mishra et al. |
| 10,728,087 B2 | 7/2020 | Agarwal et al. |
| 11,088,943 B2 | 8/2021 | Agarwal et al. |
| 2016/0219070 A1* | 7/2016 | Vasseur ................. G06F 21/552 |
| 2017/0257308 A1* | 9/2017 | Cropper .................. H04L 67/10 |
| 2020/0304365 A1 | 9/2020 | Bhardwaj et al. |
| 2020/0358681 A1 | 11/2020 | Shah et al. |

* cited by examiner

*Primary Examiner* — Gregory A Kessler
(74) *Attorney, Agent, or Firm* — Baratta Law PLLC; Lawrence A. Baratta, Jr.

(57) ABSTRACT

Systems and methods for adaptively re-adjusting meter rates of processor cores of a multi-core processor having ports grouped in a Link Aggregation Group (LAG) are provided. A method, according to one implementation, includes a step of obtaining a metering allocation setting for a service on each of a plurality of processor cores. The plurality of processor cores is configured to receive data traffic via a plurality of data ports. The data ports are configured to be grouped so as to serve as a single logical port from the perspective of an external component. The method further includes a step of determining an anticipated metering need associated with the service on each of the processor cores. Also, the method performs an adaptive metering procedure that includes automatically adjusting the metering allocation setting for the service based on the respective anticipated metering need.

20 Claims, 6 Drawing Sheets

ADAPTIVE SERVICE METERING ON PORTS IN A LINK AGGREGATION GROUP

TECHNICAL FIELD

The present disclosure generally relates to networking systems and methods. More particularly, the present disclosure relates to adaptively adjusting metering allocation settings of processor cores to meet an anticipated need with respect to service ports in a network, particularly services ports in a Link Aggregation Group (LAG).

BACKGROUND

Generally, one way to increase capacity or bandwidth in a communications network is to combine or aggregate multiple links (e.g., ports, network connections, etc.) together. For example, the process known as "link aggregation," which is defined at least in IEEE 802.3ad, includes combining multiple physical ports in parallel to increase traffic throughput and to provide redundancy. Such a grouping of links or ports is known as a Link Aggregation Group (LAG). To increase bandwidth in a network, a network operator may create a LAG by joining multiple physical Ethernet links into one logically recognizable link.

In addition, the creation of a network infrastructure involves the deployment of network processors. In many cases, the network processors include multiple processing cores. These multi-core processors are manufactured by a number of different vendors and are typically designed with two, four, or eight processing cores or any other suitable number of cores. Multi-core processors may be utilized to help to scale a network as needed. Thus, one challenge in network planning is how to utilize the different cores to achieve optimal network performance, specifically with respect to how data packets are transmitted through the network. In some cases, these network processors may be referred to as packet processors.

Physical ports of a processor (e.g., network processor, packet processor, and the like) could be associated with different processing cores. However, the multiple processing cores can become a disadvantage with respect to "service metering" (e.g., allocating bandwidth to provide one or more network services), particularly when service metering techniques are attempted with respect to a LAG where the ports of the LAG are distributed across multiple cores. For instance, some conventional packet processors may be metered (or allocated) in a way that is associated with each processing core, where capability cannot be shared across different cores.

A network operator may be required to program the meter rates on each core to achieve the desired service rates over the LAG. For example, one common practice may include programming the meter rates on each core by equally dividing the total bandwidth by the number of ports of the LAG. Thus, if a LAG includes three ports and is configured to manage a bandwidth of 12 Gbps, the bandwidth may be divided evenly among the ports such that each port would be configured to manage 4 Gbps. However, this may lead to an "under-metering" scenario.

Figure 1:
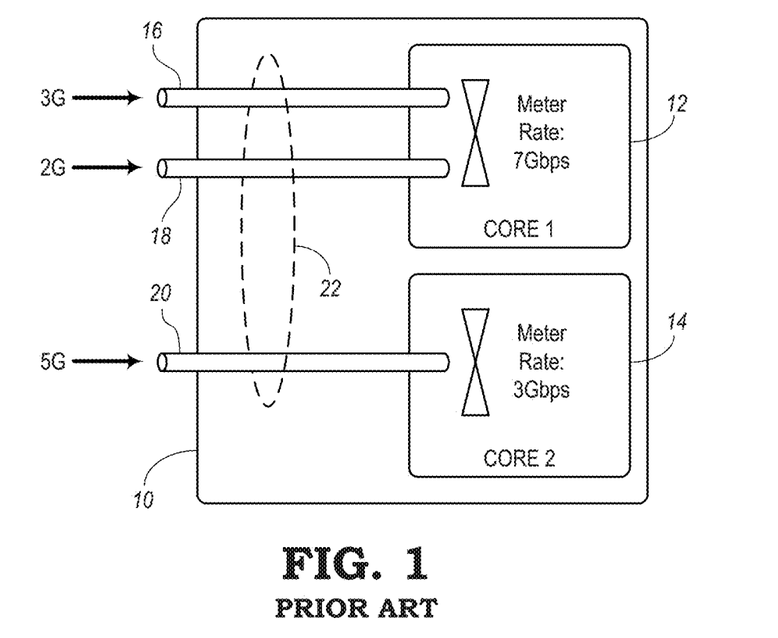
FIG. 1 is a diagram illustrating a multi-core processor where a conventional metering strategy is enacted, resulting in an under-metering situation.

FIG. 1 is a diagram illustrating an under-metering scenario that may result in response to enacting conventional strategies. In this example, a multi-core processor 10 includes a first core 12 (i.e., CORE 1) and a second core 14 (i.e., CORE 2). The multi-core processor 10 also includes ports 16, 18, and 20, where ports 16, 18 lead to the first core 12 and port 20 leads to the second core 14. The ports 16, 18, 20 are grouped together in a LAG 22.

In this example, suppose the cores 12, 14 are configured to handle network services requiring 10 Gbps. With three ports 16, 18, 20, the bandwidth can be distributed somewhat evenly (i.e., about 10 Gbps divided by three). For example, suppose the cores 12, 14 are programmed such that 7 Gbps is distributed to the first core 12 and 3 Gbps is distributed to the second core 14. In other words, the meter rate of the first core 12 is set to 7 Gbps and the meter rate of the second core 14 is set to 3 Gbps. Thus, ports 16, 18 may handle up to 7 Gbps of network traffic and port 20 may handle up to 3 Gbps of network traffic. This distribution maintains the 10 Gbps allocation for the LAG 22.

However, suppose that the ingress traffic of 10 Gbps is destined for LAG 22, where the ingress traffic is distributed in a way where 5 Gbps of capacity is processed or arriving on the first core 12 and comes in through ports 16, 18, where 3 Gbps is on port 16 and 2 Gbps is on port 18. Also, suppose 5 Gbps of capacity is arriving for processing by the second core 14 and is intended to come in through port 20. Since the ingress traffic on the third port 20 is 5 Gbps in this example but the second core 14 is only programmed to handle 3 Gbps, the third port 20 would drop the packets since the meter rate is too low (i.e., under metered) in this scenario.

Figure 2:
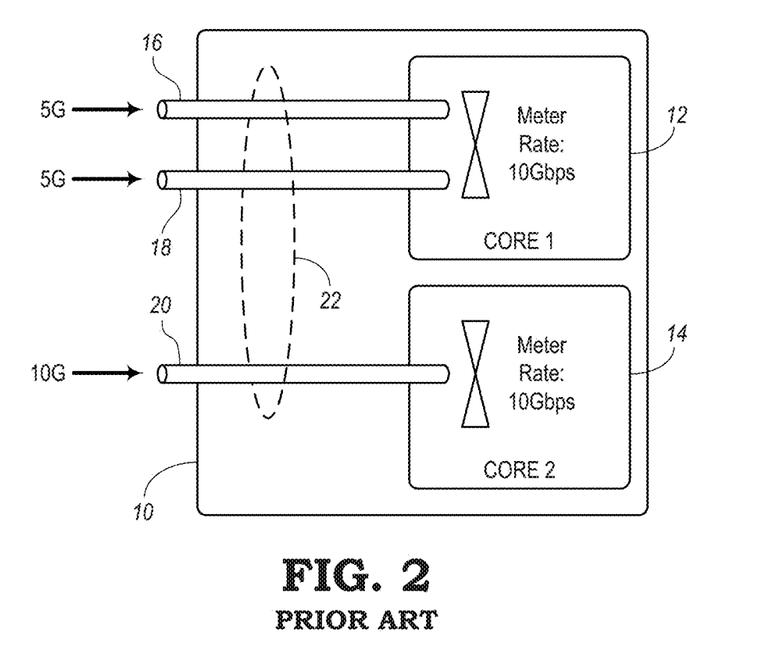
FIG. 2 is a diagram illustrating the multi-core processor of FIG. 1 where another conventional metering strategy is enacted, resulting in an over-metering situation.

FIG. 2 is a diagram illustrating the multi-core processor 10 of FIG. 1 where another conventional metering strategy is enacted. However, this strategy results in an over-metering scenario. To prevent the under-metering scenario of FIG. 1, a network operator may instead program each of the cores 12, 14 to handle the entire 10 Gbps bandwidth. Thus, both cores 12, 14 would be metered to the same rate (i.e., 10 Gbps). In this example, if 5 Gbps were input into each of ports 16, 18, the first core 12 would be able to handle this capacity. Also, if 10 Gbps were input into port 20, the second core 14 would be able to handle this capacity. However, this actually results in the programming of 20 Gbps for the LAG 22, which is essentially twice the amount of capacity needed. This strategy, of course, is considered to be wasteful since at most 10 Gbps will be directed through the multi-core processor 10. Therefore, this strategy is referred to as "over metering" and involves an inefficient use of network resources.

Therefore, there is a need in the field of network planning to avoid (or minimize) the under-metering and over-metering scenarios that may result in response to implementing the conventional strategies described above. More particularly, new allocation strategies are needed when ports are grouped in a LAG.

BRIEF SUMMARY

The present disclosure is directed to systems and methods for metering processor cores to handle network capacity as needed. According to one implementations, a method includes a step of obtaining a metering allocation setting for a service on each of a plurality of processor cores. The plurality of processor cores may be configured to receive data traffic via a plurality of data ports. For example, the data ports may be grouped so as to serve as a single logical port from the perspective of an external component. Also, the method includes a step of determining an anticipated metering need associated with the service on each of the processor cores. The method further includes performing an adaptive metering procedure that includes automatically adjusting the metering allocation setting for the service based on the respective anticipated metering need.

According to some implementations, the data ports described above may be grouped in a Link Aggregation Group (LAG) and may be configured to provide one or more network services. The method may further include a step of periodically collecting data traffic metrics associated with the service on each of the processor cores. Then, the method may include analyzing the collected data traffic metrics to determine the anticipated metering need associated with each of the processor cores. For example, the step of analyzing the collected data traffic metrics may include a) determining a high water mark, b) determining a low water mark, c) determining a trend in the collected data traffic metrics, and/or d) utilizing a Machine Learning (ML) technique. In addition, the metering allocation setting for each processor core may be related to a) a maximum packet processing rate, b) a data packet capacity, c) a network bandwidth, and/or d) a service bandwidth.

According to some implementations, a single multi-core processor package may include the processor cores described above. For example, the single multi-core processor package may be configured to execute the method described above. Also, the single multi-core processor package may further include a collector module, an analyzer module, and a programmer module implemented in a Software Development Kit (SDK). In additional implementations, a network device may be configured to execute the method described above, wherein the network device may be arranged external to one or more network components that include the processor cores. As such, the network device may be a Network Element (NE), a Network Management System (NMS), and/or a network controller.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

The present disclosure relates to systems and methods for developing strategies for planning sections of a communications network. To prevent packets from being dropped and to prevent over-metering, an adaptive metering procedure can be performed, as described in the present disclosure. This adaptive metering procedure is configured to overcome the deficiencies of the conventional metering strategies where under-metering and over-metering may result. Therefore, by implementing the strategies discussed in the present disclosure, fewer packets may be dropped and network resources will not be wasted. Particularly, the systems and methods of the present disclosure are configured to handle service metering over Link Aggregation Groups (LAGs) by configuring separate meter rates on each processing core (e.g., of a multi-core processor), where each core may have n number of LAG ports.

The embodiments described herein are configured to program the meter rates on each core to achieve the desired service meter rates over the complete LAG. Since the conventional systems do not offer a viable solution with respect to reducing or eliminating under-metering and over-metering, the embodiments of the present disclosure are able to provide additional functionality to enable an adaptive plan for intelligently distributing network bandwidth to the ports of a LAG.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

Figure 3:
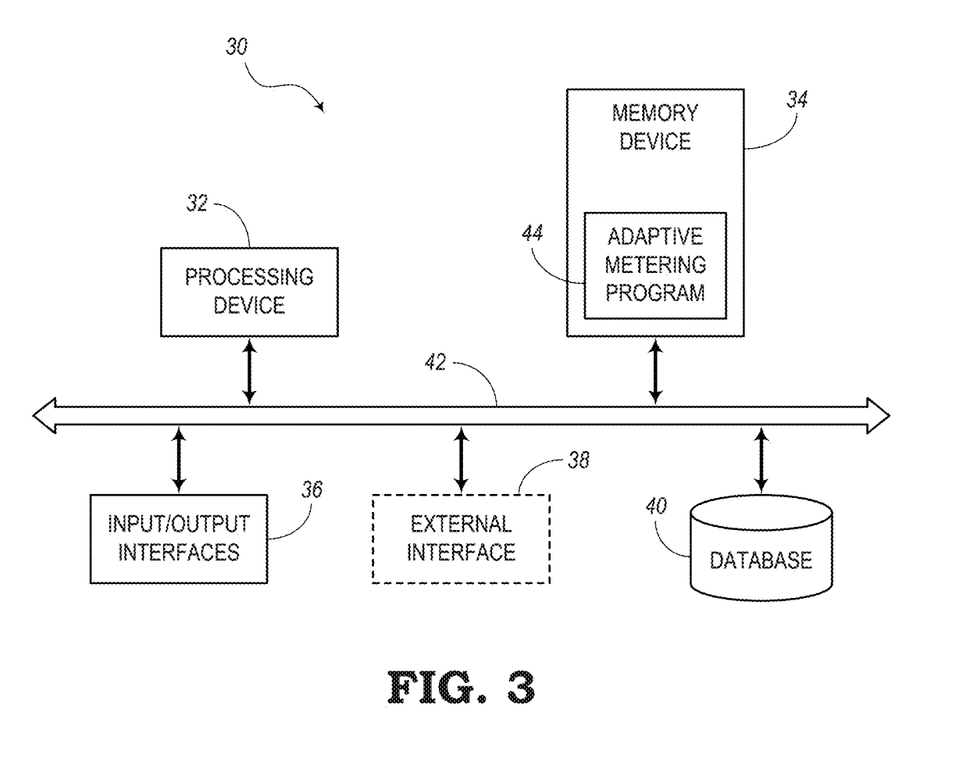
FIG. 3 is a block diagram illustrating a computing device configured to perform an adaptive metering procedure on multiple processing cores to prevent or minimize under-metering situations and over-metering situations, according to various embodiments of the present disclosure.

FIG. 3 is a block diagram illustrating an embodiment of a computing device 30 configured to perform an adaptive metering procedure with respect to multiple processing cores to prevent or minimize under-metering situations and over-metering situations. The processing cores being adaptively metered may be part of the computing device 30 or may be incorporated in an external device and controlled by the computing device 30 for adjusting the metering allocation settings.

In the illustrated embodiment, the computing device 30 may be a digital computing device that generally includes a processing device 32, a memory device 34, Input/Output (I/O) interfaces 36, an external interface 38, and a database 40. It should be appreciated that FIG. 3 depicts the computing device 30 in a simplified manner, where some embodiments may include additional components and suitably configured processing logic to support known or conventional operating features. The components (i.e., 32, 34, 36, 38, 40) may be communicatively coupled via a local interface 42. The local interface 42 may include, for example, one or more buses or other wired or wireless connections. The local interface 42 may also include controllers, buffers, caches, drivers, repeaters, receivers, among other elements, to enable communication. Further, the local interface 42 may include address, control, and/or data connections to enable appropriate communications among the components 32, 34, 36, 38, 40.

It should be appreciated that the processing device 32, according to some embodiments, may include or utilize one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), semiconductor-based devices, chips, and the like). The processing device 32 may also include or utilize stored program instructions (e.g., stored in hardware, software, and/or firmware) for control of the computing device 30 by executing the program instructions to implement some or all of the functions of the systems and methods described herein. Alternatively, some or all functions may be implemented by a state machine that may not necessarily include stored program instructions, may be implemented in one or more Application Specific Integrated Circuits (ASICs), and/or may include functions that can be implemented as custom logic or circuitry. Of course, a combination of the aforementioned approaches may be used. For some of the embodiments described herein, a corresponding device in hardware (and optionally with software, firmware, and combinations thereof) can be referred to as "circuitry" or "logic" that is "configured to" or "adapted to" perform a set of operations, steps, methods, processes, algorithms, functions, techniques, etc., on digital and/or analog signals as described herein with respect to various embodiments.

The memory device 34 may include volatile memory elements (e.g., Random Access Memory (RAM), Dynamic RAM (DRAM), Synchronous DRAM (SDRAM), Static RAM (SRAM), and the like), nonvolatile memory elements (e.g., Read Only Memory (ROM), Programmable ROM (PROM), Erasable PROM (EPROM), Electrically-Erasable PROM (EEPROM), hard drive, tape, Compact Disc ROM (CD-ROM), and the like), or combinations thereof. Moreover, the memory device 34 may incorporate electronic, magnetic, optical, and/or other types of storage media. The memory device 34 may have a distributed architecture, where various components are situated remotely from one another, but can be accessed by the processing device 32.

The memory device 34 may include a data store, database (e.g., database 40), or the like, for storing data. In one example, the data store may be located internal to the computing device 30 and may include, for example, an internal hard drive connected to the local interface 42 in the computing device 30. Additionally, in another embodiment, the data store may be located external to the computing device 30 and may include, for example, an external hard drive connected to the Input/Output (I/O) interfaces 36 (e.g., SCSI or USB connection). In a further embodiment, the data store may be connected to the computing device 30 through a network and may include, for example, a network attached file server.

Software stored in the memory device 34 may include one or more programs, each of which may include an ordered listing of executable instructions for implementing logical functions. The software in the memory device 34 may also include a suitable Operating System (O/S) and one or more computer programs. The O/S essentially controls the execution of other computer programs, and provides scheduling, input/output control, file and data management, memory management, and communication control and related services. The computer programs may be configured to implement the various processes, algorithms, methods, techniques, etc. described herein.

Moreover, some embodiments may include non-transitory computer-readable media having instructions stored thereon for programming or enabling a computer, server, processor (e.g., processing device 32), circuit, appliance, device, etc. to perform functions as described herein. Examples of such non-transitory computer-readable medium may include a hard disk, an optical storage device, a magnetic storage device, a ROM, a PROM, an EPROM, an EEPROM, Flash memory, and the like. When stored in the non-transitory computer-readable medium, software can include instructions executable (e.g., by the processing device 32 or other suitable circuitry or logic). For example, when executed, the instructions may cause or enable the processing device 32 to perform a set of operations, steps, methods, processes, algorithms, functions, techniques, etc. as described herein according to various embodiments.

The methods, sequences, steps, techniques, and/or algorithms described in connection with the embodiments disclosed herein may be embodied directly in hardware, in software/firmware modules executed by a processor (e.g., processing device 32), or any suitable combination thereof. Software/firmware modules may reside in the memory device 34, memory controllers, Double Data Rate (DDR) memory, RAM, flash memory, ROM, PROM, EPROM, EEPROM, registers, hard disks, removable disks, CD-ROMs, or any other suitable storage medium.

Those skilled in the pertinent art will appreciate that various embodiments may be described in terms of logical blocks, modules, circuits, algorithms, steps, and sequences of actions, which may be performed or otherwise controlled with a general purpose processor, a DSP, an ASIC, an FPGA, programmable logic devices, discrete gates, transistor logic, discrete hardware components, elements associated with a computing device, controller, state machine, or any suitable combination thereof designed to perform or otherwise control the functions described herein.

The I/O interfaces 36 may be used to receive user input from and/or for providing system output to one or more devices or components. For example, user input may be received via one or more of a keyboard, a keypad, a touchpad, a mouse, and/or other input receiving devices. System outputs may be provided via a display device, monitor, User Interface (UI), Graphical User Interface (GUI), a printer, and/or other user output devices. I/O interfaces 36 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an InfraRed (IR) interface, a Radio Frequency (RF) interface, and a Universal Serial Bus (USB) interface.

According to embodiments in which the computing device 30 is external to one or more processors whose processing cores are being adaptively metered, the external interface 38 may be configured to communicate with these processors. Otherwise, if the one or more processor whose processing cores are being adaptively metered are incorporated in the computing device 30 itself, then the external interface 38 in this case can be omitted.

The external interface 38, when presence, may be used to enable the computing device 30 to communicate over a network, the Internet, a Wide Area Network (WAN), a Local Area Network (LAN), and the like. The external interface 38 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The external interface 38 may include address, control, and/or data connections to enable appropriate communications to establishing metering rates on the one or more processor being adaptively metered.

The computing device 30 includes an adaptive metering program 44, which may be implemented in any suitable combination of hardware, software, firmware, etc. When implemented in software or firmware, the adaptive metering program 44 may be stored in any suitable non-transitory computer-readable media, such as the memory device 34 (as shown). When implemented in hardware, the adaptive metering program 44 may be configured in the processing device 32, for example.

According to various embodiments of the present disclosure, the adaptive metering program 44 is configured to enable or cause the processing device 32 to perform certain actions to create meter settings in the processing cores of a packet processor or network processing unit, whereby the meter settings define the network capacity or bandwidth of each of the processing cores. For example, the adaptive metering program 44 may include instructions or computer logic configured to enable the processing device 32 to obtain a metering allocation setting for a service on each of a plurality of processor cores, where the plurality of processor cores may be configured to receive data traffic via a plurality of data ports, and where the data ports are grouped so as to serve as a single logical port from the perspective of an external component. The adaptive metering program 44 may further enable the processing device 32 to determine an anticipated metering need associated with the service on each of the processor cores. Then, the adaptive metering program 44 may be configured to enable the processing device 32 to perform an adaptive metering procedure that includes automatically adjusting the metering allocation setting for the service based on the respective anticipated metering need.

For example, the data ports described above may be grouped in a Link Aggregation Group (LAG) and may be configured to provide one or more network services. The processor cores may be incorporated in a single multi-core processor package. According to some embodiments, the computing device 30 may be incorporated in this single multi-core processor package. In other embodiments, the computing device 30 may be incorporated in one of a Network Element (NE), Network Management System (NMS), and network controller that is arranged external to one or more network components that include the above-mentioned processor cores.

The adaptive metering program 44 may further include instructions that enable the processing device 32 to periodically collect data traffic metrics associated with the service on each of the processor cores. Then, the processing device 32 may analyze the collected data traffic metrics to determine the anticipated metering need associated with each of the processor cores. In some implementations, the step of analyzing the collected data traffic metrics may include a) determining a high water mark, b) determining a low water mark, and/or c) determining a trend in the collected data traffic metrics. According to various implementations, the step of analyzing the collected data traffic metrics may include utilizing a Machine Learning (ML) technique.

For example, the metering allocation setting for each processor core, as described above, may be related to a) a maximum packet processing rate, b) a data packet capacity, c) a network bandwidth, and/or d) a service bandwidth. The processor cores may be arranged in a packet processor or network processing unit. The adaptive metering procedure of the adaptive metering program 44 may include a) a bandwidth re-configuring procedure, b) a bandwidth re-distributing procedure, and/or c) a traffic policing procedure, where these procedures may be implemented for re-allocating the data traffic to the processor cores on a per-service basis. The adaptive metering program 44 is configured to reduce or eliminate under-metering scenarios and over-metering scenarios with respect to the processor cores.

Thus, the adaptive metering program 44, in use in the computing device 30, is configured to solve the inefficiency of the conventional strategies by providing a metering scenario by which the computing device 30 can auto-adapt the metering rates (per service) on ports of a LAG, where the ports are distributed across processor cores. This adaptive metering is able to achieve a desired service metering as defined by a network operator. The adaptive metering program 44 provides solutions to collect, analyze, and then act in advance before the problems associated with the conventional metering strategies can happen. In some embodiments, the adaptive metering program 44 may include smart learning (e.g., Artificial Intelligence (AI), Machine Learning (ML), and the like) to inform the user about situations that may normally go beyond a workable solution, but which can be solved by the adaptive metering program 44.

Figure 4:
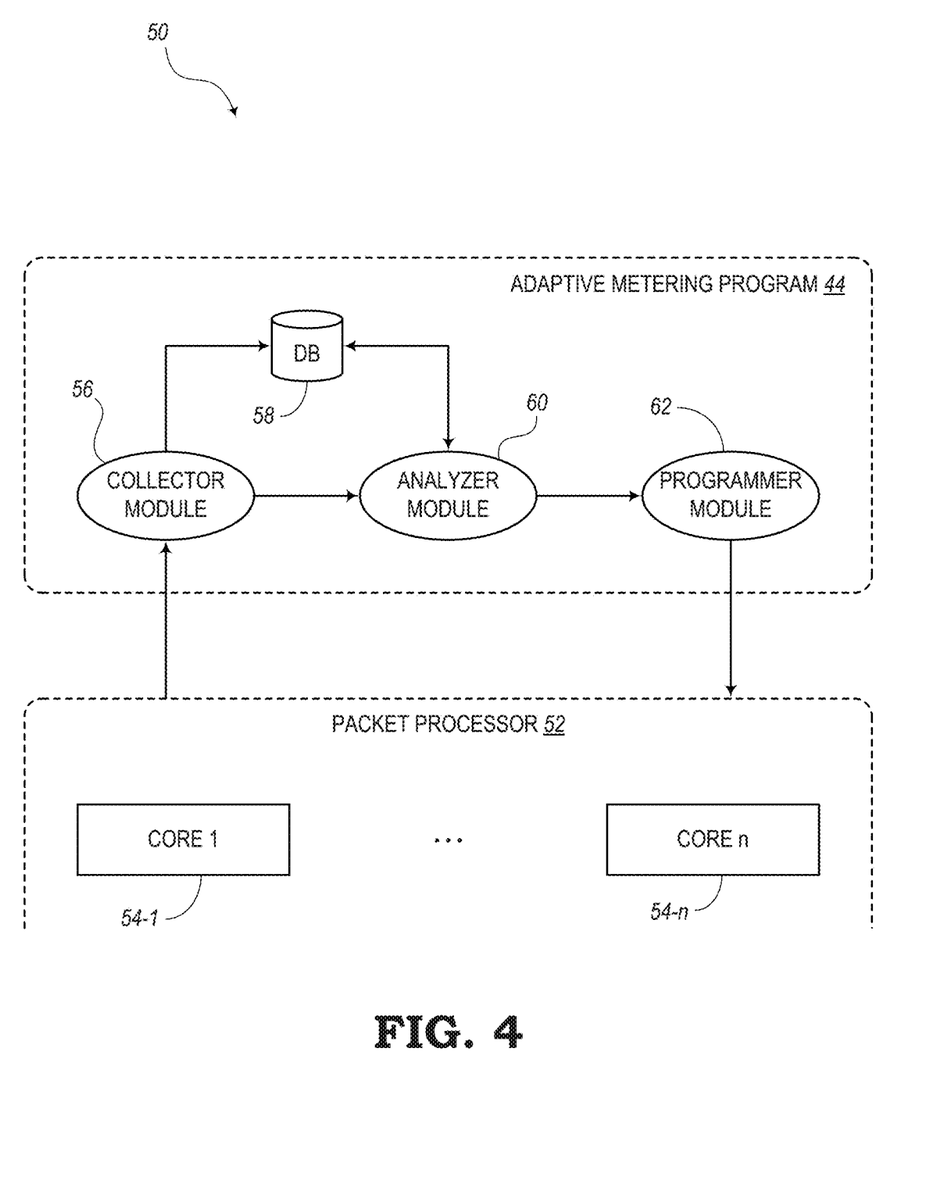
FIG. 4 is a diagram illustrating elements of the adaptive metering program shown in FIG. 3, according to various embodiments of the present disclosure.

FIG. 4 is an embodiment of a system 50 illustrating the interaction among elements of the adaptive metering program 44 and a packet processor 52 (or network processing unit). The packet processor 52 includes a plurality of cores (e.g., processing cores) 54-1 . . . 54-n. In some embodiments, the cores 54-1 . . . 54-n may be incorporated in more than one packet processor. The adaptive metering program 44 includes a collector module 56 (or collector), a database 58, an analyzer module 60 (or analyzer), and a programmer module 62 (or programmer). According to some embodiments, some or all of the components 56, 58, 60, 62 of the adaptive metering program 44 may include suitable software building blocks and may be created using a suitable Software Development Kit (SDK).

The collector module 56 may be configured to perform collection actions, such as obtaining information from each one of the cores 54-1 . . . 54-n. The collector module 56 may include logic or instructions for periodically collecting data traffic metrics. The data traffic metrics may be stored, for example, in the database 58. The analyzer module 60 may be configured to retrieve the data from the database 58 and/or receive information directly from the collector module 56. The analyzer module 60 may include logic or instructions for analyzing the collected data traffic metrics using any suitable statistical analysis processes. As a result of the analyses, the programmer module 62 may also include logic or instructions for performing the adaptive metering procedure described in the present disclosure.

Thus, the adaptive metering program 44, according to various embodiments, may include a three-step solution for adaptively metering the packet processor 52. In one embodiment, the three-step solution may include:

1. Collection Procedure (e.g., executed by the collector module 56): collecting service meter statistics per core 54-1 . . . 54-n for services configured over LAG (and distributed across the cores 54) at a periodic time interval. In some embodiments, the collection interval may be defined by a user (e.g., network operator) and/or may be kept at a default (e.g., every X seconds). In some embodiments, the collector module 56 may include actions based on historical machine learned information.

Figure 7:
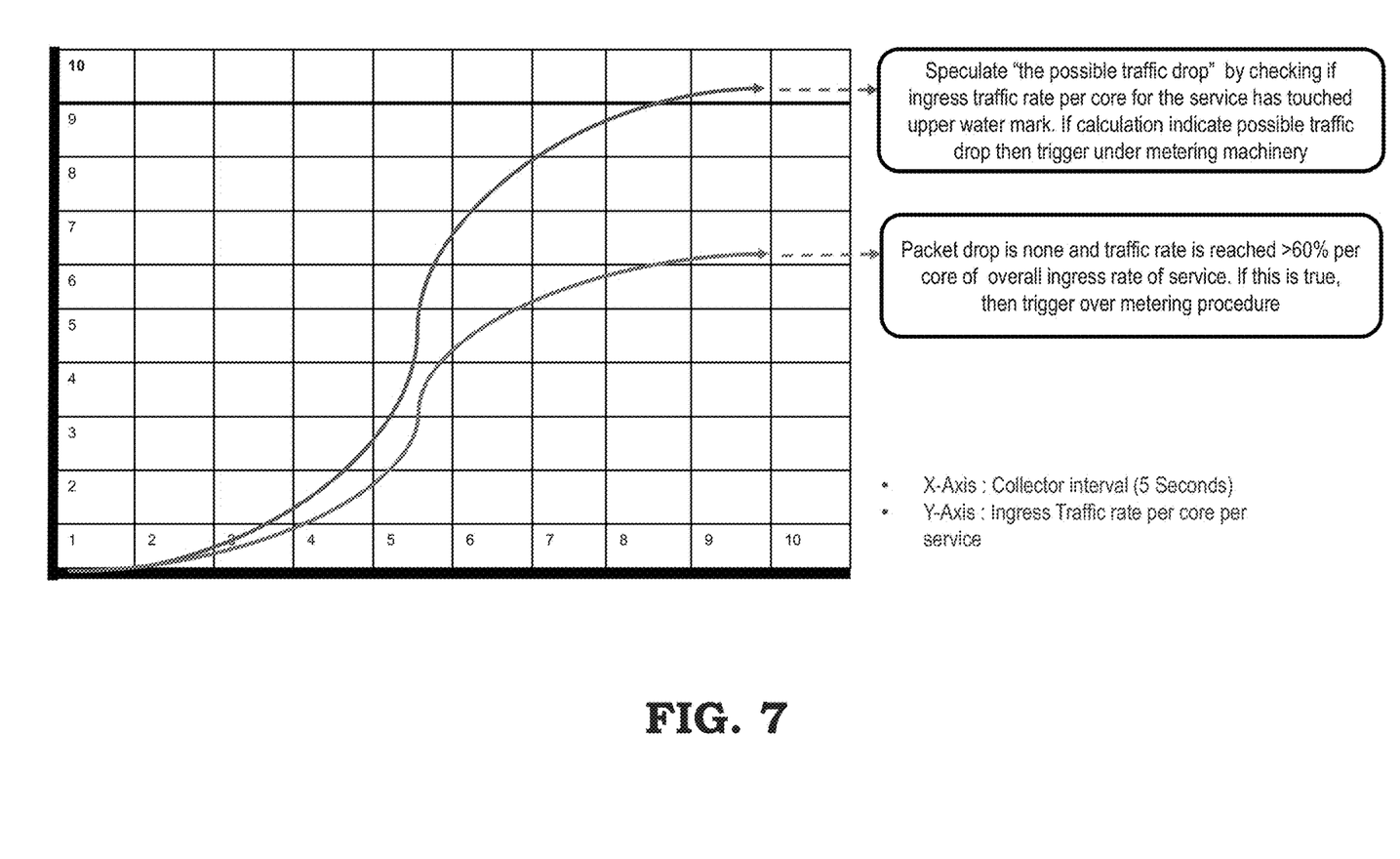
FIG. 7 is a graph of an example analysis procedure, according to various embodiments.

2. Analysis Procedure (e.g., executed by the analyzer module 60): based on the data collected for the services from different cores, running analytics on the traffic stats per service and validate if the stats exceed a Low Water Mark (LWM) and/or a High Water Mark (HWM), which can be predetermined values or determined based on historic data. The analysis procedure can validate if the metering rates do not fall within acceptable ranges and would need to be adjusted to minimize under-metering or over-metering. An example of the analysis procedure is shown in a graph in FIG. 7.

3. Programming Procedure (e.g., executed by the programmer module 62): configure, reconfigured, or re-distribute the new meter rates per core 54 on the packet processor 52. In some embodiments, the reconfiguring or re-distributing actions may be based on suggestions from the analyzer module 60.

The analyzer module 60 may be configured to parse the collected data and collate information of a service coming from different cores 54-1 . . . 54-n. The analyzer module 50 may analyze an upcoming pattern or trend if a particular service meter may hit the HWM on a meter that would cause packets to be dropped. For such selected services which may get affected, the analyzer module 60 may perform further cross-analyses of information and see if meter rates on other cores can be adjusted to cover the drops. The analyzer module 60 may be configured to determine certain actions, decisions, or recommendations, which may be shared with the programmer module 62. The programmer module 62, for example, may then receive these actions, decisions, or recommendations from the analyzer module 60 for various meters. The programmer module 62 can then collate the changed information and program the packet processor 52 to the new defined parameters.

Figure 5:
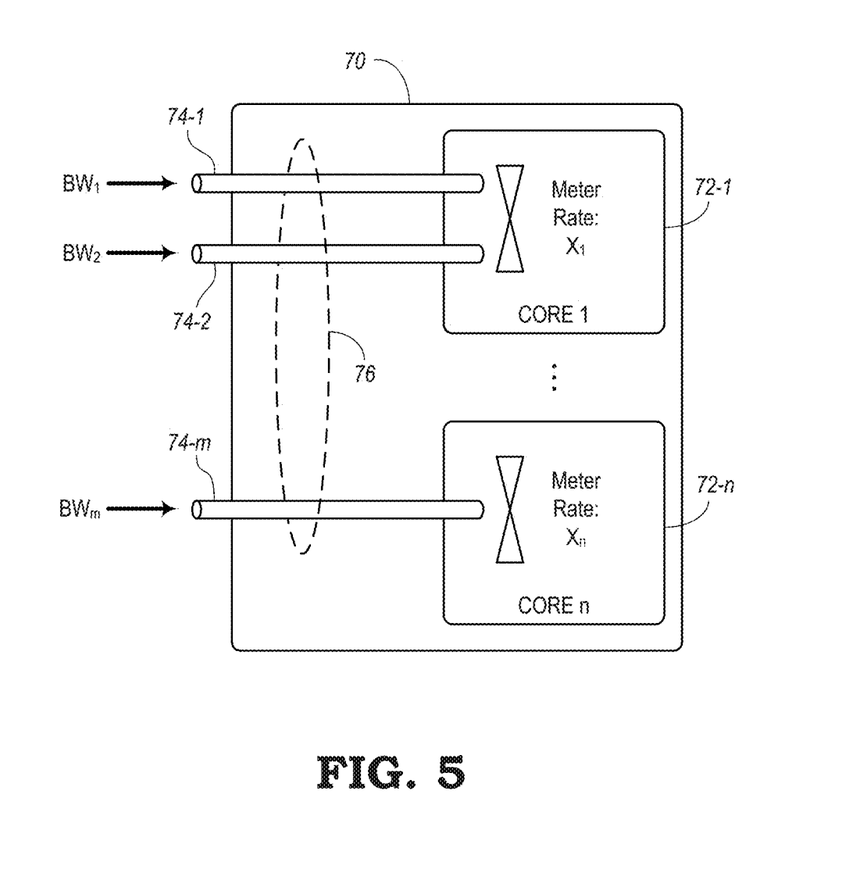
FIG. 5 is a diagram illustrating a multi-core processor where the adaptive metering procedure of the present disclosure is enacted, according to various embodiments.

FIG. 5 is a diagram illustrating an embodiment of a multi-core processor 70 where the adaptive metering procedure of the present disclosure is enacted. In this embodiment, the meter rates are not pre-set, but may include adaptable or changeable metering settings for allocating or distributing capacity or bandwidth as needed. The multi-core processor 70 includes a number (n) of cores 72-1 . . . 72-n. For example, n may be 2, 4, 8, or any suitable number. Also, the multi-core processor 70 includes a number (m) of ports 74-1, 74-2, . . . , 74-m. The ports 74 may receive packets for processing on any combination of the cores 72. Each core 72 may include any suitable number of ports 74. The ports 74 may be grouped in any suitable manner as a defined grouping 76, such as a LAG. A total amount of bandwidth (or network traffic capacity) may be defined by BW1+BW2+ . . . +BWm on the m number of ports 74, combined within the grouping 76. This bandwidth can be distributed to the cores 72 and thereby enable each port 74 to accommodate a certain amount of data packets in a given timeframe.

In some embodiments, the multi-core processor 70 may be controlled according to the systems and methods of the present disclosure for enabling an adaptive metering procedure. This adaptive metering procedure may be executed using instructions, code, software, logic steps, etc. of the adaptive metering program 44, SDK, or other suitable logical or computer-executable program. The adaptive metering procedure enacted on the multi-core processor 70, as described in the present disclosure, may include individually creating and/or setting certain meter rates for services on each of the cores 72-1 . . . 72-n. The cores 72 (or processing cores) of the multi-core processor 70 (e.g., packet processor, network processing unit, or the like) are configured with these meter settings, which define the network capacity or bandwidth of each of the processing cores 72.

Adaptive metering procedures may include various steps. For example, one adaptive metering procedure may include obtaining a metering allocation setting for a service on each of a plurality of processor cores 72, where the plurality of processor cores 72 may be configured to receive data traffic via the plurality of data ports (e.g., ports 74-1, 74-2, . . . , 74-m). The data ports are grouped (e.g., in a LAG 76) so as to serve as a single logical port from the perspective of an external component. This adaptive metering procedure may further include determining an anticipated metering need associated with each of the processor cores 72-1 . . . 72-n. Then, the procedure may include performing the adaptive re-configuring or re-distribution actions for automatically adjusting the metering allocation settings for each of the processor cores 72, which may be based on the respective anticipated metering need.

Figure 6:
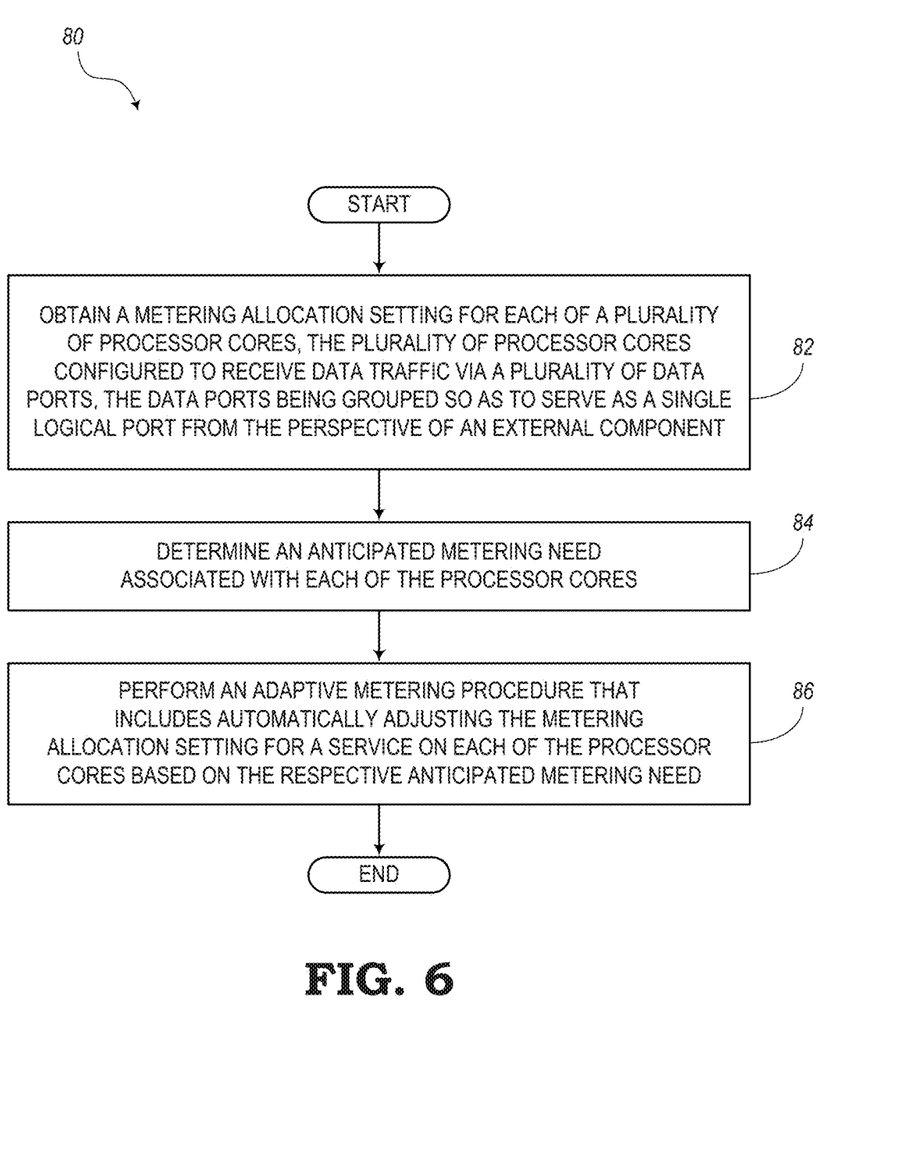
FIG. 6 is a flow diagram illustrating a process for enacting the adaptive metering procedure of the present disclosure, according to various embodiments.

FIG. 6 is a flow diagram illustrating an embodiment of a process 80 for enacting the adaptive metering procedure of the present disclosure. For example, the process 80 may include obtain a metering allocation setting for a service on each of a plurality of processor cores, as indicated in block 82, whereby the plurality of processor cores are configured to receive data traffic via a plurality of data ports. Also, the data ports may be grouped so as to serve as a single logical port from the perspective of an external component. The process 80 further includes the step of determining an anticipated metering need associated with each of the processor cores, as indicated in block 84. Also, the process 80 includes performing an adaptive metering procedure that includes automatically adjusting the metering allocation setting for each of the processor cores based on the respective anticipated metering need, as indicated in block 86.

Therefore, the embodiments of the present disclosure are configured to provide solutions to the problems that arise with the conventional strategies for setting metering rates of processing cores. By automatically re-adjusting bandwidth, the problems of under-metering and over-metering can be reduced or eliminated.

The per service dynamic adaptation on service meters across the cores can provide an advantage over conventional systems. The present solutions use collector, analyzer, and programmer modules to provide a novel way of adapting to the changes in service traffic and overcomes limitations of various packet processors. The present solutions can be executed on a Network Element (NE) or may be taken off the box to scale and improve. In some embodiments, the present solutions do not require additional hardware resources in a packet processor and can intelligently solve the limitations of various packet processors from various vendors.

The embodiments of the present disclosure may be deployed to enhance various network equipment, network boxes, and the like, and provide the capability and behavior with advanced multi-core chipsets. The present solutions can avoid both the under-metering and over-metering problems to a great extent within these network devices or boxes. Also, the present solutions do not put any configuration restrictions on network operators using LAG ports in the network boxes. In some cases, network operators may choose to keep the ports of the various groupings (e.g., LAG) from the same core. This can allow the network operators to use ports across different cores.

Since the collector, analyzer, and programmer functionality may be handled in software, it can be implemented on any multi-core platforms without any hardware limitations and can be enhanced to do advance analyses of various services and their flows. The collector and analyzer functionalities in some cases can be outsourced to some other machine/entity (e.g., Network Management System (NMS), Software-Defined Networking (SDN) controller, or the like). In this case, the programmer functionality may reside in the network box. It may be noted that there may be no interop implications as implementation will be local to the network boxes. Overall, these solutions may enhance or improve existing network box capability and behaviors with advanced multi-core packet processor chipsets.

The metering of bandwidth described in the present disclosure may be defined as various types of packet metering, traffic policing, etc. in a packet switching environment. The adaptive metering may be applied to network processors, network processing units, packet processors, and the like. These processors include multiple cores, Central Processing Units (CPUs), or the like, for processing (e.g., switching) network traffic Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A system comprising:
   a processing device, and
   a memory device configured to store a computer program having instructions that, when executed, enable the processing device to
     obtain a metering allocation setting for a service on each of a plurality of processor cores of a packet processor or network processing unit, the plurality of processor cores configured to receive data traffic via a plurality of data ports grouped in a Link Aggregation Group (LAG) so as to serve as a single logical port from the perspective of an external component,
     determine an anticipated metering need associated with the service on each of the processor cores, and
     perform an adaptive metering procedure that includes automatically adjusting an amount of bandwidth based on the metering allocation setting for each of the plurality of data ports in the LAG based on the respective anticipated metering need wherein the adaptive metering procedure is configured to address under-metering scenarios and over-metering scenarios with respect to the processor cores of the packet processor or network processing unit via a re-adjustment of the amount of bandwidth.

2. The system of claim 1, wherein the anticipated metering need is determined and the adaptive metering procedure is performed at a periodic time interval to update the metering allocation setting.

3. The system of claim 1, wherein the processor cores are incorporated in a single multi-core processor package.

4. The system of claim 3, wherein the system is incorporated in the single multi-core processor package.

5. The system of claim 1, wherein the system is incorporated in one of a Network Element (NE), Network Management System (NMS), and network controller and is arranged external to one or more network components that include the processor cores.

6. The system of claim 1, wherein the instructions further enable the processing device to
   periodically collect data traffic metrics associated with the service on each of the processor cores, and
   analyze the collected data traffic metrics to determine the anticipated metering need associated with each of the processor cores.

7. The system of claim 6, wherein analyzing the collected data traffic metrics includes analyzing the collected data traffic metrics to determine a trend in the collected data traffic metrics.

8. The system of claim 6, wherein analyzing the collected data traffic metrics includes utilizing a Machine Learning (ML) technique.

9. The system of claim 6, wherein the computer program includes a collector module, analyzer module, and programmer module implemented in a Software Development Kit (SDK), wherein the collector module includes instructions for periodically collecting the data traffic metrics, wherein the analyzer module includes instructions for analyzing the collected data traffic metrics, and where the programmer module includes instructions for performing the adaptive metering procedure.

10. The system of claim 1, wherein the amount of bandwidth for each of the plurality of data ports in the LAG added together is set based on an overall amount of bandwidth for the service.

11. The system of claim 1, wherein the amount of bandwidth for any given data port of the plurality of data ports in the LAG is less than an entire bandwidth of the service.

12. The system of claim 1, wherein the adaptive metering procedure includes one or more of a bandwidth re-configuring procedure, a bandwidth re-distributing procedure, and a traffic policing procedure for re-allocating the data traffic for the service to the processor cores, and is implemented on a per-service basis.

13. The system of claim 12, wherein the adaptive metering procedure is configured to determine the amount of bandwidth for each of the plurality of data ports in the LAG based on comparisons to acceptable ranges and adjustments thereof outside of the acceptable ranges, the ranges are based on one of slats, a predefined range, or historical data.

14. A non-transitory computer-readable medium configured to store computer logic having instructions that, when executed, cause one or more processing devices to:
   obtain a metering allocation setting for a service on each of a plurality of processor cores of a packet processor or network processing unit, the plurality of processor cores configured to receive data traffic via a plurality of data ports grouped in a Link Aggregation Group (LAG) so as to serve as a single logical port from the perspective of an external component,
   determine an anticipated metering need associated with the service on each of the processor cores, and
   perform an adaptive metering procedure that includes automatically adjusting an amount of bandwidth based on the metering allocation setting for each of the plurality of data ports in the LAG based on the respective anticipated metering need wherein the adaptive metering procedure is configured to address under-metering scenarios and over-metering scenarios with respect to the processor cores of the packet processor or network processing unit via a re-adjustment of the amount of bandwidth.

15. The non-transitory computer-readable medium of claim 14, wherein the anticipated metering need is determined and the adaptive metering procedure is performed at a periodic time interval to update the metering allocation setting.

16. The non-transitory computer-readable medium of claim 14, wherein the processor cores are incorporated in a single multi-core processor package, and wherein the non-transitory computer-readable medium is incorporated in the single multi-core processor package.

17. The non-transitory computer-readable medium of claim 14, wherein the non-transitory computer-readable medium is incorporated in one of a Network Element (NE), Network Management System (NMS), and network controller and is arranged external to one or more network components that include the processor cores.

18. The non-transitory computer-readable medium of claim 14, wherein the computer logic includes a collector module, analyzer module, and programmer module implemented in a Software Development Kit (SDK).

19. A method comprising the steps of:
obtaining a metering allocation setting for a service on each of a plurality of processor cores of a packet processor or network processing unit, the plurality of processor cores configured to receive data traffic via a plurality of data ports grouped in a Link Aggregation Group (LAG) so as to serve as a single logical port from the perspective of an external component,
determining an anticipated metering need associated with the service on each of the processor cores, and
perform an adaptive metering procedure that includes automatically adjusting an amount of bandwidth based on the metering allocation setting for each of the plurality of data ports in the LAG based on the respective anticipated metering need wherein the adaptive metering procedure is configured to address under-metering scenarios and over-metering scenarios with respect to the processor cores of the packet processor or network processing unit via a re-adjustment of the amount of bandwidth.

20. The method of claim 19, further comprising the steps of
periodically collecting data traffic metrics associated with each of the processor cores, and
analyzing the collected data traffic metrics to determine the anticipated metering need associated with the service on each of the processor cores,
wherein the step of analyzing the collected data traffic metrics includes one or more of
determining a trend in the collected data traffic metrics, and
utilizing a Machine Learning (ML) technique.

* * * * *